July 12, 1960   C. H. WHITMORE   2,944,632
CENTRIFUGAL DUST COLLECTOR
Filed Sept. 11, 1956   3 Sheets-Sheet 1
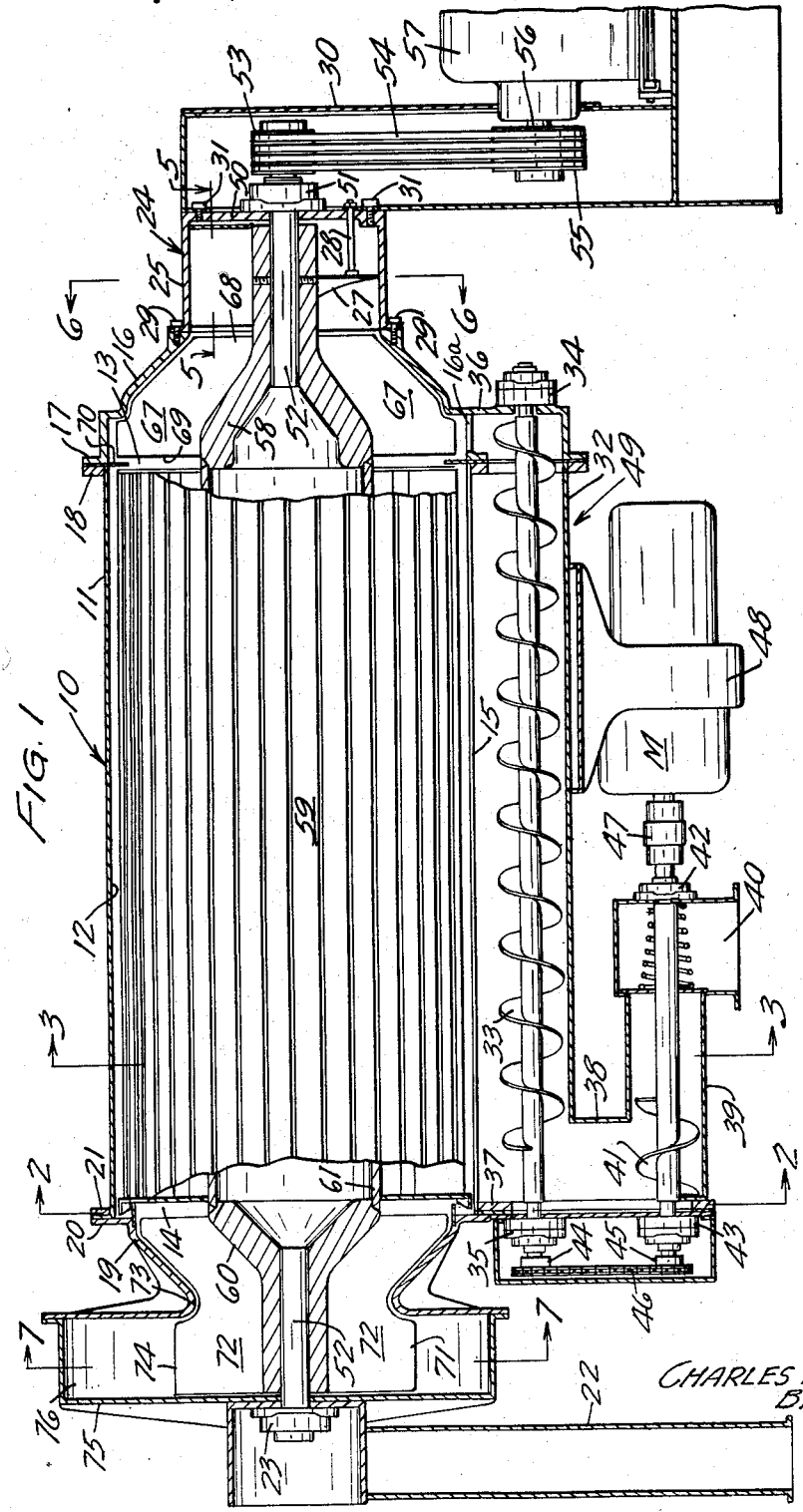
INVENTOR
CHARLES H. WHITMORE
BY Williamson,
Schroeder,
Adams, & Meyers
ATTORNEYS July 12, 1960
C. H. WHITMORE
2,944,632
CENTRIFUGAL DUST COLLECTOR
Filed Sept. 11, 1956
3 Sheets-Sheet 2
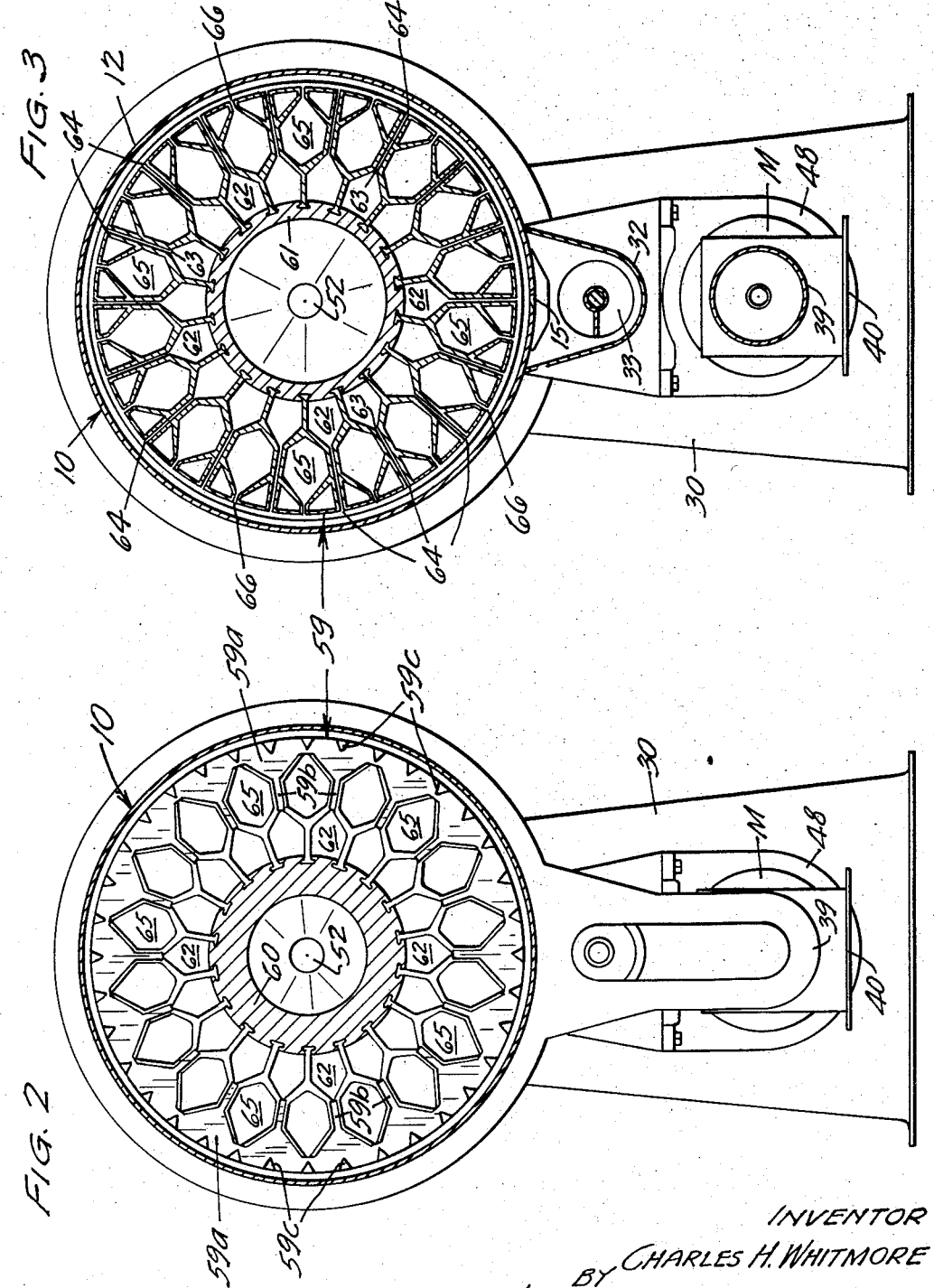
INVENTOR
CHARLES H. WHITMORE
BY
Williamson, Schroeder Adams & Meyers
ATTORNEYS July 12, 1960 C. H. WHITMORE 2,944,632
CENTRIFUGAL DUST COLLECTOR
Filed Sept. 11, 1956 3 Sheets-Sheet 3

INVENTOR
CHARLES H. WHITMORE
BY Williamson, Schroeder, Adams & Meyers
ATTORNEYS

2,944,632
CENTRIFUGAL DUST COLLECTOR

Charles H. Whitmore, 2517 W. 66th St., Minneapolis, Minn.

Filed Sept. 11, 1956, Ser. No. 609,299

8 Claims. (Cl. 183—77)

This invention relates to dust collectors, and more particularly to a rotary driven dust collector of the centrifugal type.

In the art of separating suspended solid particles or dust from a gas such as air, many devices have been proposed. For example, the conventional dust filter separates dust from the air through actual collection upon the surface of a screen or fibrous body as the air passes therethrough. The dust filter is physically large considering the quantity of air which can pass through it per unit of time. As the filter mat builds up upon the surface, the resistance of the dust filter becomes greater and the power requirements also become greater, in order to force air through the even decreasing porosity of the mat. The ordinary dust filters will not handle hot or humid gases, nor are they ordinarily adapted to corrosive atmospheres. The large internal volume and particular construction required in dust filter apparatus reduces the possibility of retaining dust explosions. In certain instances, electrical collectors or precipitators are employed, and these also are found wanting in many respects. As a rule, the electrical dust collector cannot handle a heavy concentration of dust and the efficiency of collection varies with humidity of the gaseous medium. The cost of operation is usually quite high and there is also present the danger of not being able to retain dust explosions when organic finely divided material is thus precipitated.

Another type of dust collector used in the prior art is the wet scrubber. This type of dust collector is usually quite large for its collection capacity and the finely divided solids or dust cannot be reclaimed in dry form since a liquid is used to collect the material. Where water is used in the scrubber, and the device is subject to outside temperatures, such equipment is often in danger of damage from freezing.

We are concerned in this specification only with the art which relates to such separation of dust or other finely divided particles suspended in a gaseous medium which can be accomplished by centrifugal action upon the particles. In a centrifugal or inertia type dust collector, there are certain important qualities which should be strived for. Broadly speaking, these qualities are high separating efficiency, ample capacity and a low power consumption. In order to obtain good separating efficiency with high capacity, it is recognized that the greater the centrifugal force, the faster the particles will be separated from the gas if all the other variables remain constant. Dust or suspended particles fall, due to the force of gravity, at different rates through a given gas, depending upon the density, shape and size of the particle. Larger particles fall at a rate which can conveniently be measured in feet per minute. Very small particles settle at a much slower rate and often must be measured in inches per hour. Centrifugal force can be employed as a substitute for gravity for increasing the rate of fall of such particles. If the centrifugal force is great enough, very small particles which may fall in time intervals measured in hours, under normal circumstances, can be made to separate out in a matter of seconds. It will be evident that the greater the centrifugal force applied to the gas which carries the small particles, the less time is required to separate the particles from the gas. For this reason, it is possible to pass the gas through the collector faster and increase the capacity of the apparatus. Conversely, a smaller collector may be employed to achieve the same separation and capacity if a greater centrifugal force is applied. It is, of course, well known that the centrifugal force may be increased by increasing the radius or increasing the angular velocity of the centrifugal collector rotor. Centrifugal force varies directly as the radius of the pathway of a given particle, and varies as the square of the angular velocity.

In the case of conventional centrifugal collector design, it has often been found that the rate of speed of the rotor is limited because of the dangerous stresses placed upon the material of construction. Also, where the design of the equipment is such as to have stationary parts presenting pockets and sharp edges to rapidly moving parts which are in proximity thereto, a turbulence may be set up which will increase with speed and off-set the added advantage from higher centrifugal force. It should also be pointed out that the higher the speeds of rotation, the greater the power consumption will be. Where there is turbulence, in the area of the deposited dust, the eddy currents of air or other gaseous medium tends to pick up dust which has already been separated, and again returns it to the gas stream. Dust particles thus returned to the main body of air or gaseous medium must be again separated and withdrawn from the apparatus before the air stream is discharged or the separation will be inefficient. In some existing centrifugal collectors, a radius of as much as five feet is employed and local turbulent conditions may exist where the dust must travel through such great distances. In order to compensate for the difficulties created by the large diametered equipment, some dust collectors have been redesigned to employ a multiplicity of small centrifugal units. Radial distances as small as one inch have been employed and turbulence may be minimized where such small radii are employed, but the increased resistance of the multiplicity of centrifugal spiralling gas streams again raises the power requirements of the apparatus. Such devices are relatively expensive, large in size, and generally cannot retain dust explosions.

The collector apparatus disclosed herein and constituting my invention is provided with specially designed gas passages that greatly improve the centrifugal separating characteristics of the dust-laden gas and keep the turbulence at a minimum while accommodating a high capacity of gas to be centrifugally treated. By reducing turbulence in my centrifugal collector, I have been able to reduce power requirements. Additionally, I have devised yet another system for further markedly reducing the power requirements of my collector by reclaiming much of the kinetic energy of the gas within the apparatus before it is discharged.

It is, therefore, an important object of the invention to provide a strong and compact centrifugal-type collector which will, during operation, draw in dust-laden air, efficiently and economically separate and collect the dust from the air, all without the aid of filters, electrically charged plates, fluid sprays or the like.

Another object of the invention is to provide a centrifugal dust collector of improved characteristics which will separate a higher percentage of suspended solids of small particle size from a constantly fed flow of gas.

A further object of the invention is to provide a centrifugal dust collector in which the rotor construction minimizes turbulence and remixing of air and solids as they are separated and, at the same time, provides high structural strength for high rotational speeds.

A still further object of the invention is to provide a centrifugal dust collector which will adapt itself to strong construction with a high capacity of air to be cleaned, and will be capable of safely retaining dust explosions without rupturing the equipment.

Yet another object of the invention is to provide a dust collector which will have efficient separating characteristics and, at the same time, will reclaim driving power normally lost in the clean air discharge so as to permit a relatively lower power consumption for the capacity of the device.

Figure 1 is a vertical section taken through my entire centrifugal collecting device, certain portions being shown in full line and portions unessential to the invention being cut away;

Figure 2 is an enlarged vertical section taken on the line 2—2 of Figure 1 adjacent the discharge end of the collector;

Figure 3 is an enlarged vertical section taken on the line 3—3 of Figure 1, and showing the collecting and discharge mechanism as well as the internal construction of the rotor;

Figure 6:
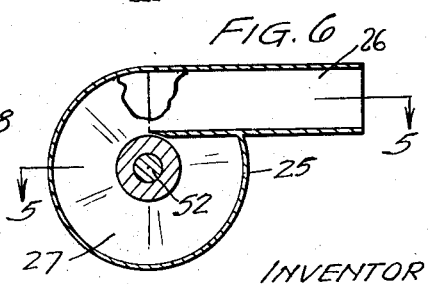
Figure 6 is a fragmentary view of the inlet in vertical section taken on the line 6—6 of Figure 1.

With continued reference to the drawings, Figure 1 shows my assembled dust collector wherein most of the parts are symmetrically arranged so as to present a dynamically balanced device during operation. A housing is indicated generally at 10 and comprises a main rotor housing 11 which is cylindrical in shape and provided with smooth inner walls 12, as shown. One end of the cylindrical housing 11 is the intake end 13 and the other end is the discharge or outlet end 14. The main rotor housing 11 is provided with a longitudinal discharge slot or opening 15, as shown in Figures 1 and 3. An intake housing 16 has a peripheral flange 17 which mates with, and is secured to, a corresponding flange 18 formed at the inlet end 13 of main rotor housing 11. Housing 16 is provided at its bottom with a discharge slot 16a. An outlet housing 19 has a peripheral flange 20 which mates with, and is secured to, corresponding flange 21 at the outlet end 14 of the main rotor housing 11. Supporting structure 22 is secured to the outlet housing 19 and a bearing member 23 is secured coaxially with the main rotor housing at the outlet end of the device. At the inlet end of the device, a pre-swirling mechanism 24 comprises a shell 25 which is secured to, and communicates with, the intake housing 16 and is provided with tangential inlet 26 as shown in Figure 6. A spiral blade member 27 is fixedly secured within the pre-swirler shell 25 by such means as bolts 28, and the shell 25 is secured at its forward end to inlet housing 16 by such means as bolts 29 and to supporting framework 30 by means of bolts 31, as shown in Figure 1.

A separate depending trough 32 underlies the discharge slot 15 and forms an airtight connection with the main rotor housing 11. Screw conveyor 33 is journaled endwise at 34 and 35 in intake housing 16 at a lower depending portion 36 thereof, and at the other end of the screw conveyor 33, is journaled in a depending portion 37 of the outlet housing 19. The trough 32 has a depending passageway 38 which communicates in a short horizontal tube 39 which, in turn, communicates with a discharge spout 40. A second screw conveyor 41 is journaled across the spout 40 and in the depending portion 37 in bearings 42 and 43, respectively. The second screw conveyor 41 in tube 39 creates an air choke during use. The screws 33 and 41 have sprockets 44 and 45, respectively, which in turn are interdriven by the roller chain 46, as shown. Motor M drives the screw conveyor 41 through coupling 47, the motor having a mount 48 secured in turn to trough 32. The screw conveyors and their associated parts constitute the collecting and discharge mechanism indicated generally at 49.

The pre-swirler 24 is provided with a rear wall 50 upon which is secured a bearing 51. A shaft 52 extends through bearing 51 and is provided with a sheave 53 at its outer end. Sheave 53 is driven through multiple belts 54 which, in turn, are engaged with the sheave 55 secured to shaft 56 of the main motor drive 57, all as shown in Figure 1. As a part of the shaft 52, there is a flared concentric member 58 which is rigidly secured to one end of the chambered rotor element 59. Another flared member 60 is secured to the opposite end of the rotor 59 and shaft 52 terminates in the bearing 23 secured to the outer end of the outlet housing 19. The chambered rotor element 59 may be hollow at its center with the inner walls 61 defining a central space. Centrifugal action adjacent the axial line of shaft 52 does not have much practical use.

Referring now to Figure 3, the rotor 59 is provided with a multiplicity of longitudinal and horizontal passageways or chambers 62 which are of smooth constant cross section and arranged peripherally about the inner wall 61. Each of the chambers 62 narrows outwardly in a slot 63 which terminates in a peripheral outlet 64 closely adjacent the smooth inner wall surface 12 of the main rotor housing 11. A second series of horizontal passageways 65 are also arranged radially about the shaft 52 and are provided with elongated and narrow slot openings 66 which lie substantially in the same circumferential surface with the slotted openings 64. The openings 64 and 66, the passageways 63, 62 and 65 are all substantially in parallel alignment with the shaft 52. The passageways 62 and 65 are adapted to receive dust-laden air and to discharge dust or finely divided particles through the respective slotted openings 64 and 66 at the inner peripheral surface 12 of the main rotor housing 11. An end plate 59a is secured over the rotor 59 as shown in Figure 2. End plate 59a has fingers 59b which cover the slots 63 to prevent dust from passing out into the discharge passageway 14. Plate 59a does not, however, cover the openings or passageways 62 or 65 and, hence, permits clean air to pass outwardly through discharge 14. Lugs 59c are mounted peripherally of the end plate 59a and rotate therewith to create a slight reduced pressure between the housing and rotor which amounts to an air seal.

The flared member 58 passes through a fixed spiral vane 27 in the pre-swirler 24 and rotates relatively thereto. A plurality of vanes 67 comprises a momentum-conditioning element and are secured to the flared member 58 in the intake housing 16. The blades 67 may have a smaller radius at the intake edge 68 than they do at the opposite edge 69. In such case, some energy must be added to bring the air up to its highest speed. An annular plate 70 is interposed between the connecting flanges 17 and 18 so as to cause the incoming air to be guided as it leaves the momentum-conditioning blades 67 into the elongated passageways 62 and 65, and away from the space between housing 11 and rotor 59. As the rotor 59 turns, dust is centrifugally forced outwardly through the slots 64 and 66 as will be described in more detail in connection with the specific example described below.

My energy reclaiming member 71 has a plurality of blades 72 which are, in turn, radially secured to the flared member 60 within the discharge or outlet housing 19. Each of the blades 72 has an effective diameter approximating that of the rotor 59 at the discharge end of the device and rotates in fixed relation with the rotor 59 and its passageways 62 and 65. Intermediate the inner and outer ends of the blades 72, the effective diameter of the energy reclaiming member 72 may be diminished at 73 to correspond to an increase in diameter of blades 67 at the other end of the collector. When so diminished, the lateral velocity of the air is, therefore, greatly increased at this point, while its rotating velocity is decreased. The outer ends 74 of the blades 72 constitute a fan with a diameter somewhat increased over that of the diminshed intermediate diameter at 73. The outer portion 75 of housing 19 may be similar to that of a centrifugal fan, terminating in the tangential outlet 76.

Figure 7:
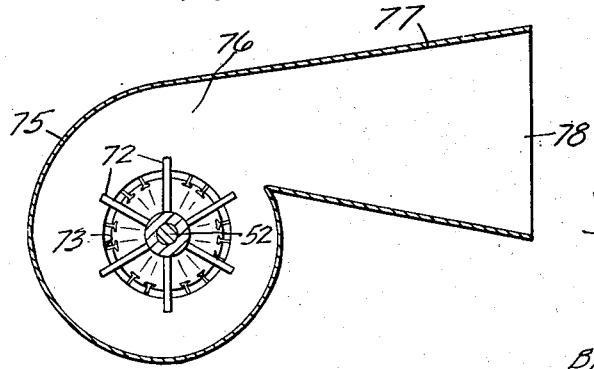
Figure 7 is a vertical section through the outlet housing taken on the line 7—7 of Figure 1, showing the diffuser structure.

Referring now to Figure 7, the fan housing 75 which terminated in outlet 76 is further provided with a diffuser 77 which is flared from the outlet 76 outwardly to terminate in a discharge mouth 78. The diffuser 77 causes the air flowing through the collector to expand volumetrically as it approaches the discharge 78. Since the quantity of air does not increase in value per unit of time, the velocity must therefore be sharply decreased as the air progresses from the tangential outlet 76 to the discharge mouth 78. The decrease in velocity of the air causes a translation of kinetic energy to pressure energy and the reduced pressure at the tangential outlet 76 further causes a partial vacuum to be pulled across the entire collector as will be presently described. The particular design of the diffuser is not critical and may be varied to suit the individual circumstances arising in each application of my invention. For general application, I have found that a linear increase of cross sectional area resulting from an eight degree flare on all sides of the diffuser 77 will usefully suit my purpose.

Figure 4:
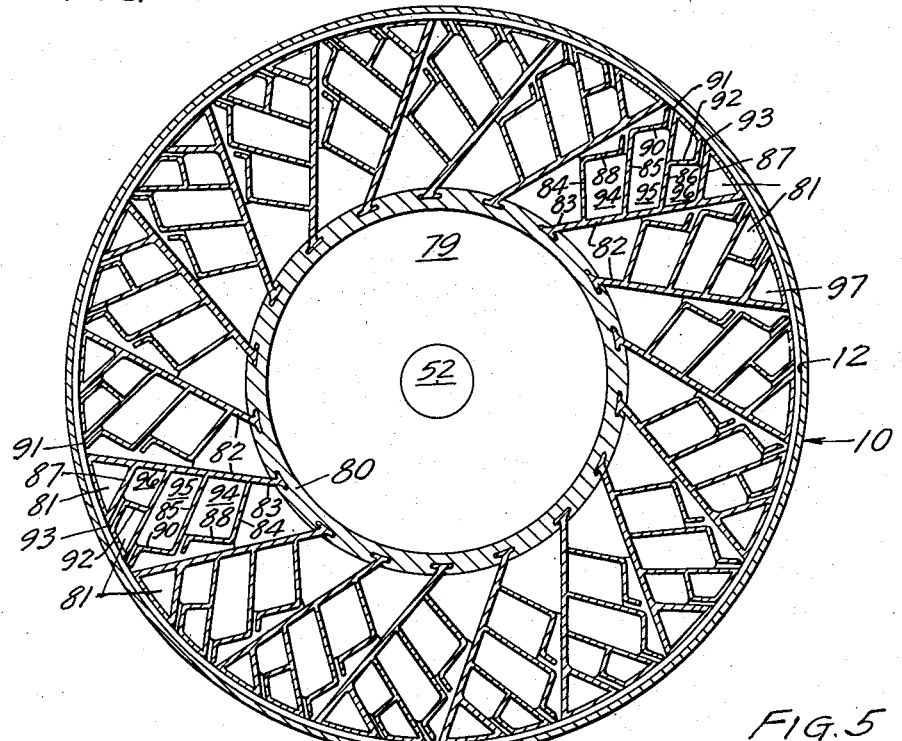
Figure 4 is an enlarged vertical section similar to Figure 3, but showing an alternate form of rotor construction.
Figure 5:
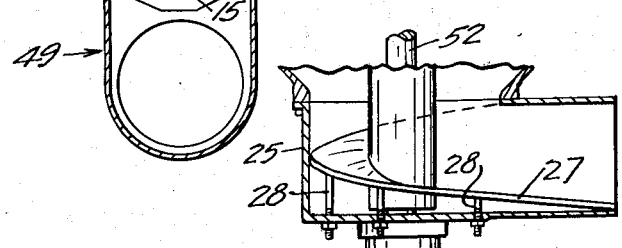
Figure 5 is a fragmentary view of the inlet in horizontal section taken on the line 5—5 of Figure 1.

Referring now to Figure 4, I there show a somewhat different form of rotor which is more suitable for larger size constructions and for adapting the rotor for interchangeable chamber structure utilizing the same inner wall or core structure. The alternate rotor is indicated at 79 and may be housed within the same housing 10 described in connection with the first form. Similarly, the same collecting and discharge mechanism 49 may be employed. The inner wall or core structure 80 is mounted on axis 52 and provides the supporting structure for chambered members 81, as shown. Each of the chambered members 81 has an elongated plate 82 secured at its inner end 83 to the outer periphery of the core or inner wall 80. The plate 82, in turn, has a plurality of webs 84, 85 and 86, secured thereto at their inner edges and in spaced relation, as shown. The outermost edge of plate 82 may be bent laterally at 87. The web 84 is bent longitudinally to form a wall 88 which, in turn, terminates closely adjacent the web 85 in a longitudinal opening 89, as shown. Web 85 is angularly bent at 90 to terminate closely adjacent the web 86. A longitudinal slotted opening 91 is thereby formed. A flange 92 is secured to the web 86 and terminates closely adjacent the outer edge 87 of plate 82 to form a slotted opening 93. The arrangement of webs 84, 85 and 86 is such as to establish longitudinal chambers or passageways 94, 95 and 96, respectively. The air which is entrapped in each of the chambers or passageways 94-96 is relieved of its dust content through the orificial openings of slots 89, 91 and 93 during rotation of the rotor. Dust is deposited at the inner surface 12 of the cylindrical housing and passes through slot 15 into the collecting and discharge mechanism 49 in the manner previously described. The structure of rotor 79 is such that a multiplicity of chambers or passageways can be constructed on each plate member secured longitudinally and peripherally of the core structure 80. It can be readily observed that the plate 82 can be lengthened or shortened to increase or decrease the effective diameter of the rotor. The plate 97 may be mounted at each end of rotor 79 and be secured to the longitudinal ends of the members 81. Each plate 97, of course, is perforate so as to maintain the continuity of the chambers or passageways 94 through 96.

In the use and operation of my collector device, dust-laden air is admitted to the pre-swirler 24 and the blade 27 causes it to move inwardly toward the rotor and, at the same time, to pick up rotational velocity. The air then enters the vanes 67 which are not required to be pitched and in the form illustrated are flat and unpitched. Vanes 67 rotate at the same rate as rotor 59 or 79. Where these vanes increase in diameter, additional energy is imparted to the air to give it the same velocity as it will maintain in the passageways or chambers within the rotor. The air is thus up to its ultimate rotational velocity before it ever enters the chambers or passageways. Since the vanes 67 function smoothly and cooperatively between the pre-swirler and the passageways, no harmful turbulence will be imparted by reason of changing directions or velocities within the longitudinal passageways. Where the incoming air contains coarse dust or grit particles, the separation may be so fast as to occur at the head end of the collecting and discharge mechanism 49. Such particles never enter the rotor passageways or chambers but pass directly into the collecting and discharge mechanism. Since the coarse particles of this nature are more apt to cause wear in the moving parts of the collector, such wear is restricted to the vanes 67 and that portion of the discharge which can be easily repaired or replaced. The remaining dust in the air is separated out through the slotted openings 64 and 66 in the case of rotor 59 and from the slotted openings 89, 91 and 93 in the case of rotor 79. Because of the multiplicity of chambers and the smooth ingress of air from the inlet end, there is a minimum of turbulence and the dust particles are effectively discharged through the slotted openings against the inner wall 12 of the cylindrical housing portion. The dust forms a film which continuously shifts about the inner wall until it reaches the lower discharge spot 15 through which it passes into the collecting and discharge mechanism 49. Cleaned air passes outwardly from the rotor passageways and into the centrifugal fan which, in turn, discharges the air into the diffuser with the resultant drop in pressure previously noted. The fan housing and diffuser 75 and 77 convert nearly all of the velocity energy of the air into pressure energy. Since the diffuser 77 discharges through mouth 78 into the atmosphere, the inlet side of the fan will be under a negative pressure. A small amount of the pressure energy is used to overcome the resistance in the ducts leading to the collector and the resistance in the collector itself. The rest of this negative pressure creates a pressure differential across the pre-swirler 24 which causes the air to be discharged therefrom tangentially to the rotor at high velocity. The air now contains velocity energy and, where vanes 67 of increasing diameter are employed, a lesser amount of energy will be required to accelerate the air to the maximum velocity of the horizontal passageways or chambers. Since the rotor turns at one constant speed and there is a constant volume of air, the only way the velocity of the air can be changed is by increasing or decreasing the radius at which it rotates. As the radius is increased, the velocity increases. This takes energy to accelerate the air to the new velocity. Where the radius is decreased, the velocity becomes less and energy is given up. Thus, where the blades or vanes 72 are decreased in diameter prior to the discharged clean air entering the centrifugal fan housing 75, energy is imparted to the blades or vanes 72. In order to convert the greatest amount of energy, it is desirable to bring it to the smallest practical discharge radius before it is discharged into the fan. The air thus contains less residual energy than if it were discharged at a larger radius. There are naturally size limitations to be considered on the small diameter and, hence, it is not possible to extract all of the energy by this method.

As previously pointed out, however, the fan and diffuser convert a good portion of the remaining velocity energy into pressure energy.

A specific example of the dimensions and operating data of a collector made according to my invention is as follows:

Dust-laden air enters the collector through a system of ducts that have a frictional resistance of four inches of water at 3600 feet per minute. The rate of air flow is 3000 cubic feet per minute, and the input air temperature is 70 degrees Fahrenheit. The collector rotor is rotated at 3000 r.p.m. The discharge fan has a fifteen inch wheel diameter and the blades are curved rearwardly at 75 degrees at their tip. A pressure of 12 inches of water is developed by the fan. The pressure differential across the pre-swirler is approximately 8 inches of water since the duct and the collector accelerates the gas across the pre-swirler at approximately 7700 feet per minute, taking into account the fact that the pre-swirler is 90% efficient.

The air enters the collector at 3600 feet per minute and is accelerated to 8500 feet per minute through the pre-swirler 24. The air now contains approximately 4.2 horsepower of velocity energy before it enters the rotor 59. The air enters the rotor vanes 67 and is slowed down to 6600 feet per minute at the mean diameter. Thus, the high velocity air has given some of its energy to the rotor 59. As the air proceeds to the passageways or chambers 62, it is finally accelerated to a velocity of nearly 13,500 feet per minute and it maintains this velocity through the horizontal passageways. Upon leaving the passageways after separation of the dust particles through the discharge slots, the air velocity is slowed down to 6600 feet per minute as it enters the fan inlets. The gas leaves the fan with energy equivalent to 5.8 horsepower. The kinetic energy is converted into pressure energy by the blades 72, fan housing 75 and diffuser 77, most of which pressure energy is translated through the entire collector to assist in pouring air into the pre-swirler 24. Without the pre-swirler, the power required by the machine is approximately that of the kinetic energy of the air as it leaves the outlet fan which is approximately 7.3 horsepower. Without constricting the outlet opening from the rotor to the housing 75, the power requirement becomes roughly 10.5 horsepower. Since the pre-swirler gives the collector rotor 4.2 horsepower of energy and the fan requires 7.3 horsepower, the net energy which must be supplied to the collector is only 3.1 horsepower compared to the more than 10.5 horsepower which is required without my reclaiming process. There are, of course, other unavoidable frictional losses which occur between the rotor and the stationary housing and such losses plus other frictional losses total about 10 horsepower in the instant example. The total horsepower requirement thus becomes 13.1 and it has been found that a 15 horsepower motor may be used in practice to operate the given collector instead of a 25 horsepower motor which is required without the reclaiming means set forth.

What I claim is:

1. Apparatus for separating finely divided solids from suspension in a gaseous medium which comprises, a fixed housing having a medial cylindrical body and an inlet portion with a tangential gas inlet in one end and an outlet portion with a tangential gas outlet at the other end thereof, a rotor coaxially journaled in close clearance within the housing and having elongated smooth-walled passageways formed generally parallel to the axis thereof, said rotor having peripheral-slotted openings communicating with each of said passageways, a plurality of vanes secured to said rotor coaxially therewith and lying in close clearance with the inlet end of said cylindrical body, a spirally bladed fixed pre-swirler interposed in the inlet portion adjacent said vanes whereby to preliminarily rotate the incoming gaseous medium and its divided solids suspended therein, and a work reclaiming element having blades secured coaxially with said rotor within said housing at the outlet end thereof.

2. Apparatus for separating finely divided solids from suspension in a gaseous medium which comprises, a fixed housing having a medial cylindrical body and an inlet portion with a tangential gas inlet in one end and an outlet portion with a tangential gas outlet at the other end thereof, a rotor coaxially journaled in close clearance within the housing and having elongated smooth-walled passageways formed generally parallel to the axis thereof, said rotor having peripheral slotted openings communicating with said passageways, a plurality of flat vanes secured to said rotor coaxially therewith and lying in close clearance with the inlet end of said cylindrical body and increasing in diameter from the inlet to the rotor for imparting increased centrifugal force upon the gaseous medium and its suspended solids, a spirally bladed pre-swirler fixed with respect to said housing and interposed in the inlet portion outwardly of said flat vanes whereby to preliminarily rotate the incoming gaseous medium and its divided solids suspended therein, and a work reclaiming element having blades secured coaxially with said rotor within said housing at the outlet end thereof, said blades being of decreasing diameter outwardly of the rotor at the outlet end.

3. In apparatus for separating dust from air, the combination of a main rotor housing having a discharge opening therein, an intake fan housing secured to one end of the said main rotor housing and having an axial inlet opening, an intake pre-swirler housing having a tangential opening, pre-swirler means fixedly mounted in the intake pre-swirler housing adjacent the intake fan housing and communicating axially therewith, an outlet fan housing secured to the other end of said main rotor housing, a shaft journaled through all of said housings, a chambered rotor element mounted on said shaft within said main rotor housing and having elongated passageways substantially parallel to said shaft and having peripheral slotted outlets formed respectively therein, a momentum-conditioning fan secured to said shaft and rotatable in close clearance within said intake fan housing, an energy reclaiming fan secured to said shaft within said outlet fan housing and in close clearance therewith, and mechanism communicating with said discharge opening in the main rotor housing for collecting and discharging gas.

4. In apparatus for separating finely divided solids from suspension in a gaseous medium, the combination of a fixed housing having a medial cylindrical body and a gas inlet at one end and a gas outlet at the other end, a rotor coaxially journaled in close clearance within said housing and having smooth-walled longitudinal passageways formed in open-ended relation parallel to the axis of said rotor, each of said passageways having a narrow and elongated peripheral slotted opening for discharging dust against the inner wall of said cylindrical body, means coaxially mounted at the inlet end of said cylindrical body for imparting centrifugal force to the gaseous medium and its suspended solids prior to entering said rotor, and means coaxially mounted to said rotor within the outlet end of said housing for reclaiming kinetic energy of said gaseous medium and suspended solids as they pass from the rotor to the gas outlet end of the housing.

5. Apparatus for separating finely divided solids from suspension in a gaseous medium which comprises, a fixed housing having a medial cylindrical body and a gas inlet at one end and a gas outlet at the other end thereof, a rotor coaxially journalled in close clearance within the housing and having a plurality of elongated passageways in contiguous relation formed generally parallel to the axis of said rotor, each of said passageways having an endwise inlet and outlet and each communicating laterally outward with an elongated slotted opening terminating radially outward of the axis of said rotor, a plurality of vanes mounted coaxially of said rotor and adjacent the inlet ends of said plurality of passageways and adapted to travel at the same angular velocity as said rotor whereby to impart centrifugal force upon said gaseous medium and suspended solids therein and to permit the same to enter said passageways in smooth flow, a work reclaiming element having blades coaxially mounted with said rotor and within said housing, and a tangential discharge passageway formed in the outlet end to receive cleaned gas from the housing and to place the gas within the housing under reduced pressure.

6. The apparatus set forth in claim 5, wherein said tangential discharge passageway has a flared terminus for converting velocity energy of the discharged gases into pressure energy.

7. Apparatus for separating finely divided solids from suspension in a gaseous medium which comprises, a fixed housing having a medial cylindrical body and a gas inlet in one end and a gas outlet at the other end thereof, a rotor coaxially journaled in close clearance within the housing and having elongated smooth-walled pasasgeways formed generally parallel to the axis thereof and extending completely therethrough, said rotor having peripheral slotted openings communicating with each of said passageways, a plurality of radial vanes secured to said rotor coaxially therewith and lying in close clearance with the inlet end of said cylindrical body, an annular plate secured to the inner circumference of said fixed housing and lying in spaced relation between the rotor and said vanes, an orifice through the housing radially outward of said vanes, and means communicating with said orifice for removal of coarse suspended particles preliminarily separated by the vanes.

8. In apparatus for separating finely divided solids from suspension in a gaseous medium, the combination of a fixed housing having a medial cylindrical body and a gas inlet at one end and a gas outlet at the other end, a rotor coaxially journaled in close clearance within said housing, a plurality of elongated smooth-walled longitudinal passageways having constant cross section throughout their lengths and lying in open-ended relation within said rotor and parallel to the axis thereof, each of said passageways having a narrow and elongated slotted peripheral opening for discharging dust against the inner wall of said cylindrical body, and means coaxially mounted at the inlet end of said cylindrical body for imparting centrifugal force to the gaseous medium and its suspended solids prior to entering said rotor.

References Cited in the file of this patent

UNITED STATES PATENTS

| 2,453,593 | Putney | Nov. 9, 1948 |
| 2,459,944 | Jones et al. | Jan. 25, 1949 |
| 2,482,642 | Sylvan | Sept. 20, 1949 |
| 2,591,396 | Bergner | Apr. 1, 1952 |

FOREIGN PATENTS

| 711,371 | France | June 23, 1931 |
| 570,855 | Germany | Feb. 21, 1933 |
| 573,905 | Germany | Apr. 7, 1933 |
| 514,320 | Great Britain | Nov. 6, 1939 |